US006762594B1

(12) United States Patent
Hauer

(10) Patent No.: US 6,762,594 B1
(45) Date of Patent: Jul. 13, 2004

(54) LIMITING RING CURRENT IN SHORT CIRCUITS BETWEEN ADJACENT PARTIAL WINDINGS BY INCREASING LEAKAGE IMPEDANCE

(76) Inventor: Hanjörg Hauer, Dr. Kühne-Gasse 14, A-1230 Vienna (AT)

( * ) Notice: Subject to any disclaimer, the term of this patent is extended or adjusted under 35 U.S.C. 154(b) by 0 days.

(21) Appl. No.: 10/111,808
(22) PCT Filed: Oct. 31, 2000
(86) PCT No.: PCT/AT00/00284

§ 371 (c)(1),
(2), (4) Date: Apr. 29, 2002

(87) PCT Pub. No.: WO01/33308

PCT Pub. Date: May 10, 2001

(30) Foreign Application Priority Data

Nov. 2, 1999 (AT) .............................................. 1838/99

(51) Int. Cl.⁷ ................................................ G05F 1/14
(52) U.S. Cl. ...................... 323/255; 323/258; 323/340; 323/343; 323/362
(58) Field of Search ................................ 323/255, 258, 323/340, 343, 362

(56) References Cited

U.S. PATENT DOCUMENTS

| | | | |
|---|---|---|---|
| 3,600,664 A | | 8/1971 | Goldberg et al. |
| 3,600,668 A | | 8/1971 | Goldberg et al. |
| 3,644,786 A | * | 2/1972 | Yannucci ..................... 323/340 |
| 3,651,375 A | | 3/1972 | Ebersohl |
| 3,678,371 A | * | 7/1972 | Nuckolls ..................... 323/362 |
| 3,824,449 A | * | 7/1974 | Hase ........................... 323/255 |
| 4,130,789 A | * | 12/1978 | Neumann |
| 4,189,672 A | * | 2/1980 | Peschel ....................... 323/340 |
| 4,201,938 A | * | 5/1980 | Neumann |
| 4,255,734 A | * | 3/1981 | Owen .......................... 323/340 |
| 4,301,489 A | | 11/1981 | Stich ............................. 361/9 |
| 4,571,499 A | * | 2/1986 | Wein .......................... 323/258 |
| 4,623,834 A | * | 11/1986 | Klingbiel et al. ........... 323/258 |
| 4,860,145 A | * | 8/1989 | Klingbiel et al. ........... 323/255 |
| 5,440,225 A | * | 8/1995 | Kojima ....................... 323/362 |
| 5,786,684 A | | 7/1998 | Bapat .......................... 323/258 |
| 5,808,454 A | * | 9/1998 | Chung ......................... 323/340 |
| 6,100,673 A | * | 8/2000 | Bair et al. ................... 323/255 |

FOREIGN PATENT DOCUMENTS

| | | | | |
|---|---|---|---|---|
| AT | 365393 | 1/1982 | ............ | H05G/1/10 |
| DE | 2308319 | 8/1974 | ............ | G05F/1/14 |
| GB | 1592951 | 7/1981 | ............ | G05F/1/14 |
| GB | 2077964 | 12/1981 | ............ | G05F/1/14 |
| GB | 2284939 | 6/1995 | ............ | H01F/29/02 |

* cited by examiner

Primary Examiner—Jeffrey Sterrett
(74) Attorney, Agent, or Firm—Greenblum & Bernstein, P.L.C.

(57) ABSTRACT

The invention relates to a method for regulating the electrical voltage in electrical supply networks and/or consumer units and a device for carrying out said method. A regulating transformer (3) is inserted between a network node (1) in the supply network and/or consumer unit and at least one end user (2). The regulating transformer (3) comprises a high leakage impedance, which limits the ring current to the order of magnitude of the nominal current, in the case of a short-circuit between adjacent tappings (5) of the partial windings (4). The regulating transformer further comprises a transfer switch (7), to switch the partial windings (4).

19 Claims, 2 Drawing Sheets

LIMITING RING CURRENT IN SHORT CIRCUITS BETWEEN ADJACENT PARTIAL WINDINGS BY INCREASING LEAKAGE IMPEDANCE

CROSS-REFERENCE TO RELATED APPLICATIONS

The present application is a U.S. National Stage of International Application No. PCT/AT00/00284 filed Oct. 31, 2000 and claims priority under 35 U.S.C. §119 of Austrian Patent Application No. A 1838/99 filed Nov. 2, 1999.

BACKGROUND OF THE INVENTION

1. Field of the Invention

The invention relates to a method for regulating the electrical voltage in electrical supply networks and/or consumer units and a device for carrying out said method.

2. Discussion of Background Information

It is generally known to carry out voltage regulation only in the central network nodes of high or medium voltage networks. Further transformation to low-voltage level normally cannot be regulated under load. This network structure is oriented towards the central power supply and has the disadvantage that voltage fluctuations caused by a change in node cannot be adjusted for between the network node and the end consumer. Thus, the exploitable transfer capacity of the network components downstream from the network nodes is limited by the drop in voltage rather than by thermal strength.

Regulating transformers are provided for voltage regulation of the networks in the central network nodes. Regulating transformers are used for incremental voltage regulation in electrical networks by changing the transformer ratio. For this purpose, regulating transformers are fitted with regulating windings with tappings, which can be switched under load. During the switching processes, the load current must not be interrupted and the winding step between the relevant tappings must not be shorted. The second requirement results from the fact that during each switching process between two neighbouring tappings they are necessarily briefly connected to each other due to the first requirement, so that there is a ring current equivalent to the transformer short-circuit current between the switch and the relevant winding, the action of which the transformer is unable to withstand, especially during periodical operation. This transformer short-circuit current is relatively high, since the internal resistance of the transformer is normally small. Furthermore, the incremental switches of the transformers would have to be coordinated with the periodical switching of these high short-circuit currents.

For the above reasons, the switching process in the incremental switch of the transformer does not happen directly but rather in multiple stages, whereby transition impedances are briefly switched into the circuits of the tappings during the switching process, limiting the ring current. In Europe, ohmic transition impedances are common, and in America inductive transition impedances are common. For multi-phase switching, a number of switching principles are applied that are named after the vector diagrams of the switching processes. For example we speak of symmetrical or asymmetrical flag

SUMMARY OF THE INVENTION

The disadvantage of the measures used so far to limit the ring current is that they result in complex transition principles and require complex designs of the regulating transformers.

The aim of this invention is therefore to create a method of the type mentioned above that on the one hand avoids the above disadvantages and on the other hand allows or guarantees a better and more efficient use of the existing networks through a new field of voltage regulation application that is closer to the consumer.

The problem is solved by this invention.

The method in accordance with the invention is characterised by the fact that a regulating transformer with a transfer switch that switches the partial windings of the regulating transformer is inserted between a network node of the supply network and/or the consumer unit and at least one end consumer, whereby the regulating transformer has a high leakage impedance that limits the ring current to the order of magnitude of the nominal current in the case of a short circuit between adjacent tappings.

With this invention it is for the first time possible to carry out voltage regulation in networks or consumer units in proximity to the consumer and on the basis of regulating transformers that have an increased impedance of the regulating windings, so that a simplified step switch without transition impedances can be used.

With the liberalisation and decentralisation of electric power supply and due to the higher bi-directional work-load of the networks, the voltage differences between heavy-duty consumption, low duty and possibly the power supply will become greater on the consumer side. To maintain the voltage there should therefore be voltage regulation at the level of the low voltage or possibly at the level of the medium voltage as an economic solution.

It is a further aim of the invention to provide a device for carrying out this method, which has a simple and robust structure and which can be manufactured economically.

According to a special feature of the invention, the device for carrying out the method is characterised by the fact that the regulating transformer is designed as a longitudinal regulator with a differential capacity that is proportional to the voltage difference that is to be regulated. In accordance with the invention, longitudinal regulators for voltage maintenance are therefore provided in the network spurs, which do without the known and currently common transition impedances of the step switch and thus the resistance contacts. This is primarily possible because the voltage regulation is carried out at low-duty network points. Even an increased impedance of such a longitudinal regulator will only have a marginal effect on the total internal resistance of the network.

The need for transition impedances results from the fact that for reasons of voltage maintenance the internal network resistance and short-circuit impedance of regulating transformers is much lower than the load impedance, so that the short-circuit currents are significantly higher than the operating currents.

If the short-circuit impedance of the regulator winding is increased, e.g. by widening the leakage gap, so that the ring circuit in the case of a short circuit between adjacent tappings is of the order of magnitude of the nominal current, the additional transition impedances are not required and the step switch is simplified into a normal transfer switch.

The regulating winding can be designed both as a concentric winding and as a flat coil winding with the relevant tappings. This principle can be applied both to full transformers with regulating winding and to one-coil transformers for longitudinal regulation. The regulating winding can be connected to the secondary winding or primary winding both via one end of the winding and via a tapping.

Since the device is suitable for the voltage regulation of network spurs, its capacity based on the transitional capacity lies within a range of a some 10 kVA to some 10 MVA.

In a further embodiment of the invention, the transfer switch is a load switch without resistance contact and with only main contacts. As already shown above, such a load transfer switch offers an economical solution.

In a further embodiment of the invention, the transfer switch is a load selector without resistance contacts. This embodiment of the transfer switch also has an extremely simple structure and can be produced economically.

In further embodiments of the invention, the transfer switch can also be designed on the basis of a multi-phase camshaft controller or a chain of relays or contactors or a chain of electronic switches, in particular semiconductor switches. These embodiments of the transfer switch also have a simple structure and are extremely reliable in robust operations.

The present invention is directed to a method to regulate electric voltage in at least one of electric supply networks and consumer units with a regulating transformer located between a network node of the at least one of the electric supply networks and the consumer units and at least one end consumer, in which the regulating transformer has switchable partial windings. The process includes switching the partial windings of the regulating transformer with a transfer switch. In this manner, in an event of a short circuit between adjacent tappings of the partial windings, the regulating transformer has a high leakage impedance that limits ring current to an order of magnitude of a nominal current.

The present invention is directed to an apparatus arranged to perform a the above-noted method.

According to the invention, the transfer switch can include a load switch without resistance contacts. Further, the load switch may include only main contacts.

In accordance with an other feature of the invention, the transfer switch may include a load selector, and the load selector can be arranged without resistance contacts.

Further, according to features present invention, the transfer switch may include a multi-phase camshaft controller.

According to still another feature of the instant invention, the transfer switch can include a chain of one of relays and contactors.

In accordance with yet another feature of the invention, the transfer switch may include a chain of electronic switches. The chain of electronic switches may include semiconductor switches.

The present invention is directed to an apparatus to regulate electric voltage in at least one of electric supply networks and consumer units that includes a regulating transformer, positioned between a network node of the at least one of the electric supply networks and the consumer units and at least one end consumer, that includes a plurality of switchable partial windings, and a transfer switch arranged to selectively contact tappings of the switchable partial windings. The regulating transformer includes a leakage gap such that, in the event of a short circuit between adjacent tappings of the switchable partial windings, the regulating transformer has a high leakage impedance that limits ring current to an order of magnitude of a nominal current.

BRIEF DESCRIPTION OF THE DRAWINGS

The invention is explained in more detail on the basis of the embodiment illustrated in the figure. The figures show.

DETAILED DESCRIPTION OF THE PRESENT INVENTION

By way of introduction, it is noted that in the described embodiment the same parts and the same states are allocated the same reference numbers and the same component names, whereby the disclosures contained throughout the description can be applied by analogy to the same parts and the same states with the same reference numbers or same component names. Moreover, individual features from the embodiment illustrated can represent independent solutions according to the invention in themselves.

Figure 1:
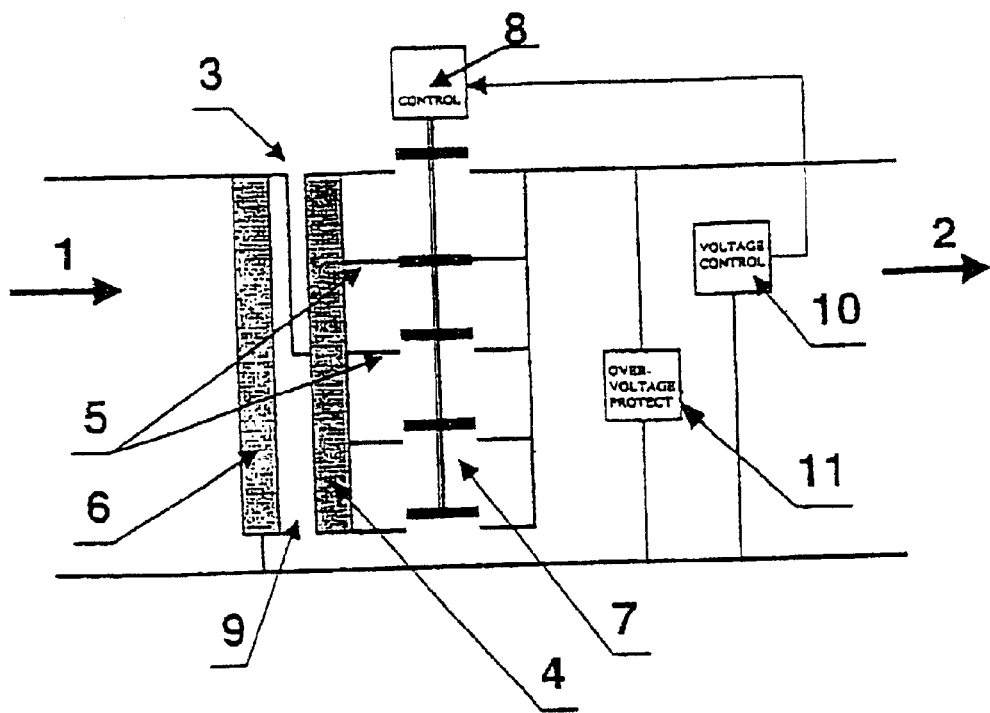
FIG. 1 a basic sketch of the arrangement of a one-coil transformer

FIG. 1 shows a device for regulating the electric voltage between one network node 1—represented by the arrow— and one end consumer 2—also represented by an arrow— whereby a regulating transformer 3 in the form of a one-coil transformer is provided for regulating the voltage. This one-coil transformer has a regulating winding with partial windings 4. The regulating winding is connected to the primary winding 6 of the one-coil transformer via a tapping 5, for example via a middle tapping. This allows both an increase and a decrease in voltage on the consumer side. The tappings 5 of the regulating winding are optionally connected with the output to the end consumer 2 via a transfer switch 7. The transfer switch 7 is controlled either via the control unit 8 without regulation or via a voltage controller 10 with regulation. The transitions are made in steps by closing a break adjacent to a closed break and then opening the original break. This allows the voltage on the consumer side to be increased or decreased. In addition, an integrated overvoltage protection 11 can be provided on the side of the end consumer 2.

To increase the short-circuit impedance of the regulating winding, the regulating transformer 3 in the embodiment as a one-coil transformer has a widened leakage gap 9. Through this increase in leakage impedance, the ring current is limited to the order of magnitude of the nominal current in the case of a short circuit.

Figure 2:
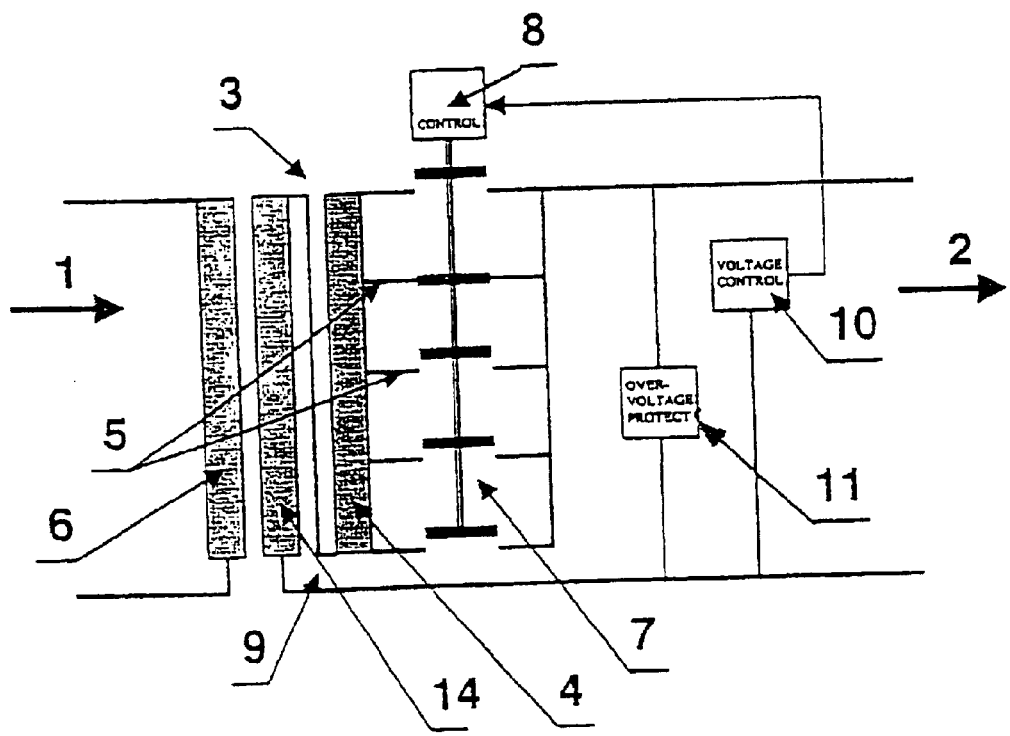
FIG. 2 a basic sketch of the arrangement of a full transformer

In FIG. 2 the device for regulating the electric voltage is again arranged between a network node 1 and an end consumer 2, whereby a regulating transformer 3 in the embodiment of a full transformer is provided for regulation. Thereby, the connection between the regulating winding and the partial windings 4 is provided via one end of the secondary winding of the regulating transformer 3. A transfer switch 7 with control unit 8 is again provided at the partial windings 4. To increase the leakage impedance, the regulating transformer 3 again has a widened leakage gap 9. The leakage impedance of the secondary winding 14 is not increased.

The transfer switch 7 is designed as a multi-phase camshaft controller and corresponds with the tappings 5 of the partial windings 4.

As in the embodiment shown in FIG. 1, the regulating transformer 3 is designed as a longitudinal regulator and has a differential capacity that is proportional to the voltage difference that is to be regulated.

Figure 3:
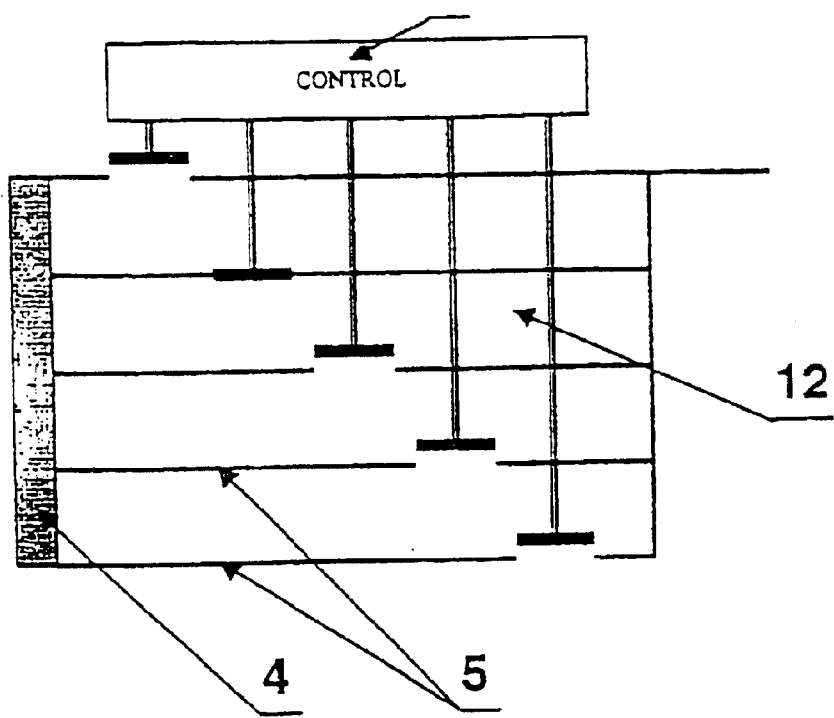
FIG. 3 a transfer switch based on contactors.

In accordance with FIG. 3, the partial windings 4 with their tappings 5 are connected with a series of contactors, which carry out the voltage regulation in accordance with the transfer switch 7 in FIGS. 1 and 2. The individual contactors 12 or relays are controlled via control units 8 that are connected to a voltage regulator.

Figure 4:
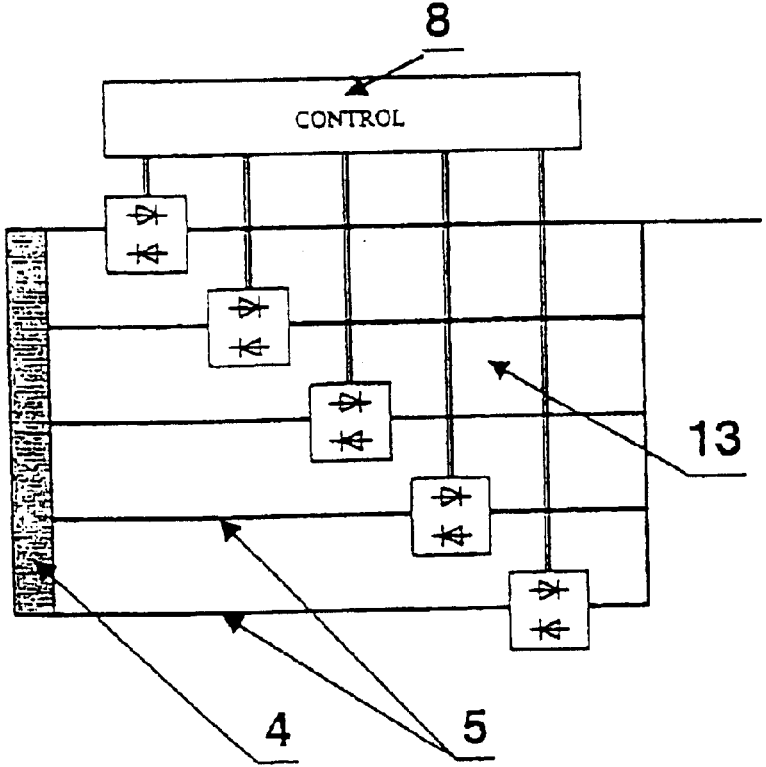
FIG. 4 a transfer switch based on semiconductors.

In accordance with FIG. 4, the partial windings 4 with their tappings 5 are connected with a series of electronic switches 13, in particular semiconductor switches, which carry out the voltage regulation in accordance with the transfer switch 7 in FIGS. 1 and 2. The individual semiconductor switches are controlled via electronic units that are connected with the voltage regulator.

For form's sake, it is noted that for a better understanding of the invention the components are illustrated partly untrue to scale and/or are enlarged and/or made smaller.

Moreover, individual features of the embodiment illustrated in the figures in combination with other individual features or alone can represent independent solutions according to the invention in themselves. In particular, the individual embodiments illustrated in the figures can represent independent solutions according to the invention. The relevant tasks and solutions according to the invention are shown in the detailed descriptions of these figures.

What is claimed is:

1. An apparatus for regulating electric voltage in at least one of electric supply networks and consumer units, the apparatus comprising:

a regulating transformer, conducting a nominal current and positioned between a network node of the at least one of the electric supply networks and the consumer units and at least one end consumer, comprising a regulating winding with a plurality of switchable partial windings;

a transfer switch arranged to selectively contact tappings of said switchable partial windings, said regulating transformer comprising a leakage gap such that, in the event of a short circuit between adjacent tappings of said switchable partial windings, said regulating winding has a high leakage impedance that limits a resultant ring current to an order of magnitude of the nominal current.

2. The apparatus in accordance with claim 1, wherein said transfer switch comprises a load switch without resistance contacts.

3. The apparatus in accordance with claim 2, wherein said load switch includes only main contacts.

4. The apparatus in accordance with claim 1, wherein said transfer switch comprises a load selector.

5. The apparatus in accordance with claim 4, wherein said load selector is arranged without resistance contacts.

6. The apparatus in accordance with claim 1, wherein said transfer switch comprises a multi-phase camshaft controller.

7. The apparatus in accordance with claim 1, wherein said transfer switch comprises a chain of one of relays and contactors.

8. The apparatus in accordance with claim 1, wherein said transfer switch comprises a chain of electronic switches.

9. The apparatus in accordance with claim 8, wherein the chain of electronic switches comprises semiconductor switches.

10. A method of regulating an electric voltage in at least one of electric supply networks and consumer units with a regulating transformer located between a network node of the at least one of the electric supply networks and the consumer units and at least one end consumer, in which the regulating transformer conducts a nominal current and has a regulating winding with switchable partial windings, the method comprising:

switching the partial windings of the regulating transformer with a transfer switch, whereby, in an event of a short circuit between adjacent tappings of the partial windings, the regulating winding has a high leakage impedance that limits a resultant ring current to an order of magnitude of the nominal current.

11. An apparatus arranged to perform the method in accordance with claim 10.

12. The apparatus in accordance with claim 11, wherein the transfer switch comprises a load selector.

13. The apparatus in accordance with claim 12, wherein the load selector is arranged without resistance contacts.

14. The apparatus in accordance with claim 11, wherein the transfer switch comprises a multi-phase camshaft controller.

15. The apparatus in accordance with claim 11, wherein the transfer switch comprises a chain of one of relays and contactors.

16. The apparatus in accordance with claim 11, wherein the transfer switch comprises a chain of electronic switches.

17. The apparatus in accordance with claim 16, wherein the chain of electronic switches comprises semiconductor switches.

18. The apparatus in accordance with claim 11, wherein the transfer switch comprises a load switch without resistance contacts.

19. The apparatus in accordance with claim 18, wherein the load switch includes only main contacts.

* * * * *